(12) United States Patent
Ismert et al.

(10) Patent No.: US 6,690,946 B1
(45) Date of Patent: Feb. 10, 2004

(54) TWO-BAND MOBILE TELEPHONE AND METHOD OF USE

(75) Inventors: Laurent Ismert, Courbevoie (FR); Bernard Combes, Paris (FR)

(73) Assignee: Sagem SA, Paris (FR)

( * ) Notice: Subject to any disclaimer, the term of this patent is extended or adjusted under 35 U.S.C. 154(b) by 440 days.

(21) Appl. No.: 09/698,637

(22) Filed: Oct. 27, 2000

(30) Foreign Application Priority Data

Oct. 29, 1999 (FR) .............................................. 99 13771

(51) Int. Cl.$^7$ ................................................. H04B 1/38
(52) U.S. Cl. ........................ 455/552; 455/67.1; 455/426
(58) Field of Search ............................... 455/67.1, 423, 455/552, 553, 425, 424, 426, 436

(56) References Cited

U.S. PATENT DOCUMENTS 5,451,839 A    9/1995  Rappaport et al. .......... 375/224
5,884,190 A  * 3/1999  Lintula et al. ............... 455/552
5,943,333 A  * 8/1999  Whinnett et al. ........... 455/552

FOREIGN PATENT DOCUMENTS

EP    0 813 312    12/1997
SE    98/58511     12/1998

* cited by examiner

*Primary Examiner*—Lee Nguyen
(74) *Attorney, Agent, or Firm*—Patterson, Thuente, Skaar & Christensen, P.A.

(57) ABSTRACT

To carry out tests on a mobile telephony network, a two-band mobile telephone is used. This mobile telephone is improved by a parametrizing device by which the mobile telephone declares itself to the network either as a single-band telephone in a first frequency band, or as a single-band telephone is a second frequency band, or as a two-band telephone in both these frequency bands. The network then exploits the mobile telephone in the mode corresponding to its declaration. It is possible with only one instrument, to measure all the transmission characteristics of the network.

5 Claims, 1 Drawing Sheet

TWO-BAND MOBILE TELEPHONE AND METHOD OF USE

BACKGROUND OF THE INVENTION

1. Field of the Invention

An object of the present invention is an improved two-band mobile telephone as well as its method of use. The aim of the invention is to propose a device of this kind that can be used with all types of network.

2. Description of the Prior Art

The field of mobile telephony includes networks known as cell networks in which base stations govern geographical cells and use them to set up links between mobile telephones in these cells and other terminals that are fixed or mobile. The exchanges between the mobile telephones and the base stations are organized according to different protocols corresponding to different standards. For example there is the known GSM 900 MHz standard in which the signals exchanged by a mobile telephone with a base station occupy a frequency band of 880 to 915 MHz while the return signals, from the base station to the mobile telephone, are located in the 925 to 960 MHz band. There is also the known DCS 1800 MHz band in which the above frequency bands are respectively 1710 to 1785 MHz and 1805 to 1880 MHz. Other standards govern other bands. In particular, the PCS standard (in the 1900 MHz range) and the UMTS standard (in the 2100 MHz range) can also be envisaged. On the whole, of the different standards, some (ARDIS, AMPS, CDPD, ISM, IS-54, IS-95 and other standards) have frequency bands located around 900 MHz while the other standards (DCS, PCS, DECT, PACS, PHS, etc.) use the band around 1800 MHz and above. The manufacturers of mobile telephones have therefore designed instruments capable of transmitting and receiving messages around the 900 MHz band, around the 1800 MHz band or around the 900 MHz band or the 1800 MHz band. These instruments are called two-band instruments.

Together with this development, testing tools have been developed to test the quality of mobile telephony networks. These testing tools enable the operators who position base stations in a cell to explore the different places of the cell and measure the quality of reception and transmission of the signals from these different places. These testing instruments are, in practice, mobile telephones also provided with a testing software program that takes measurements, at chosen places, of the qualities of the mobile telephony network. These measured qualities represent for example the level of the received signal coming from the base station in each of the ranges of a frequency band as well as, for a beacon frequency range of these base stations, any interference that would be particularly destructive in these places (this would be designed to identify the frequency ranges to be avoided in this cell) as well as, in general, all the qualities of the transmission and processing done in the base station (filtering of frequency ranges, channel encoding, speech encoding, etc.).

Naturally, to test a mobile telephony network emitting in a 900 MHz band, it is necessary to have an appropriate mobile telephone. Similarly, it is necessary to have another adapted mobile telephone to carry out measurements, at the same place in one and the same cell, of the activity of a base station that makes transmission in another band, for example in the DCS 1800 MHz band.

Furthermore, certain operators, in order to augment their ability to connect large numbers of subscribers, have base stations, in the cells, that are themselves two-band base stations. These two-band base stations are capable firstly of engaging in traffic in one band and in the other, and secondly of organizing the traffic so as to prevent saturation in either band. These two-band base stations can thus engage in traffic with a mobile telephone in one band at the same time as they engage in traffic with another mobile station in another band. If necessary, transmission and reception may be located in two different bands for one and the same mobile telephone. To this end, these two-band base stations receive information, from these mobile telephones entering their cell, according to which these mobile telephones are themselves two-band or not two-band devices. Depending on its work load, the base station may then engage in traffic with these two-band mobile telephones in either band so as to avoid traffic saturation. These two-band base stations must also be controlled with two-band telephones.

This means that the operators' agents who go on the spot to measure the qualities of the network must have three mobile telephones, one for a first band, one for a second band and one for two-band operation. The use of three types of measuring instruments is a costly constraint that is particularly complicated to implement, given the fact that the agents have to perform large numbers of measurements in several places. To this end, in the places in question, they connect the testing mobile telephone to a portable microcomputer and record the results of the measurement tests in the memory of this portable microcomputer. The testing of three networks then means that the instrument connected to the portable microcomputer must be changed. It also entails corresponding operations in the files of this portable microcomputer.

In principle, there is really no solution to this problem given the fact that the network makes its exchanges with the mobile telephone as a function of the type of this mobile telephone and that, consequently, the tests have to be conducted because of the protocol set up between the base station and the mobile telephone, this protocol itself depending on the type of mobile telephone.

However, in the invention, this problem is resolved by providing a two-band mobile telephone with three modes of operation. These modes of operation may be chosen by an operator, for example by pressing keys of the mobile telephone touchpad or through the connection of the mobile telephone to the portable computer by means of the keyboard of this portable computer. The principle of the invention is then as follows.

The mobile telephone is put into service and declares its type to the network. Its type is represented by parameters recorded in the memory of the mobile telephone. Once this declaration is made, or at least once the mobile telephone is powered on, the parameters are changed. Then the mobile telephone is turned off and then put into service again with the new parameters. These new parameters then set up a mode of operation with the base station that corresponds exclusively to one of the following modes: first band, second band, or two-band. The base station then recognizes the mobile telephone (which is a two-band telephone) respectively as a single-band telephone in the first band, a single-band telephone in the second band or a two-band telephone.

It then exchanges connection signals and traffic signals, corresponding to this recognition, with this mobile telephone. These signals are measured by the mobile telephone test program. These signals are automatically stored in the memory of the portable computer.

At the end of these tests, without any need to stop (or power off) the mobile telephone, the disconnection of the mobile telephone is prompted. In this case, the mobile telephone no longer listens to the network and the network no longer recognizes it. The parameters are then changed (before or after disconnection) and the unit is put into service again. This operation then comprises only a reconnection of the mobile telephone to the mobile telephony network. This network then starts a new recognition procedure with this mobile telephone. Thus, the same instrument has informed the network of another mode of operation (according to another band or according to a two-band mode) and a new campaign of measurements can be undertaken. In this case, the results of the measurements are also stored in a memory of the portable computer since the mobile telephone has not been disconnected from it. The method then leads to the desired result namely that the campaign of measurement of the three networks is conducted with a single instrument without manual operation and without physical disconnection of the mobile telephone from the portable microcomputer.

More generally, outside a testing context, a method of this kind enables a mobile telephone to work in either band or in a two-band manner at request. This choice, which is made possible for the user, may for example be exploited to make him choose a mobile telephony operator.

SUMMARY OF THE INVENTION

An object of the invention therefore is a two-band type mobile telephone comprising circuits for working in connection with a mobile telephony network on two frequency bands, the telephone comprising a forcing circuit to enforce a mode of operation during connection in order to operate during connection on only one of these bands.

An object of the invention is also a method for the putting into service of a multiband mobile telephone with a mobile telephony network in which:

the mobile telephone is put into service for a first time, wherein while the mobile telephone is in service during this first putting into service, the working of the mobile telephone is parametrized with second parameters, the mobile telephone is put out of service, and then the mobile telephone is put into service a second time with the second parameters.

BRIEF DESCRIPTION OF THE DRAWINGS

The invention will be understood more clearly from the following description and the appended figures. These figures are given purely by way of an indication and in no way restrict the scope of the invention. Of the figures.

MORE DETAILED DESCRIPTION

Figure 1:
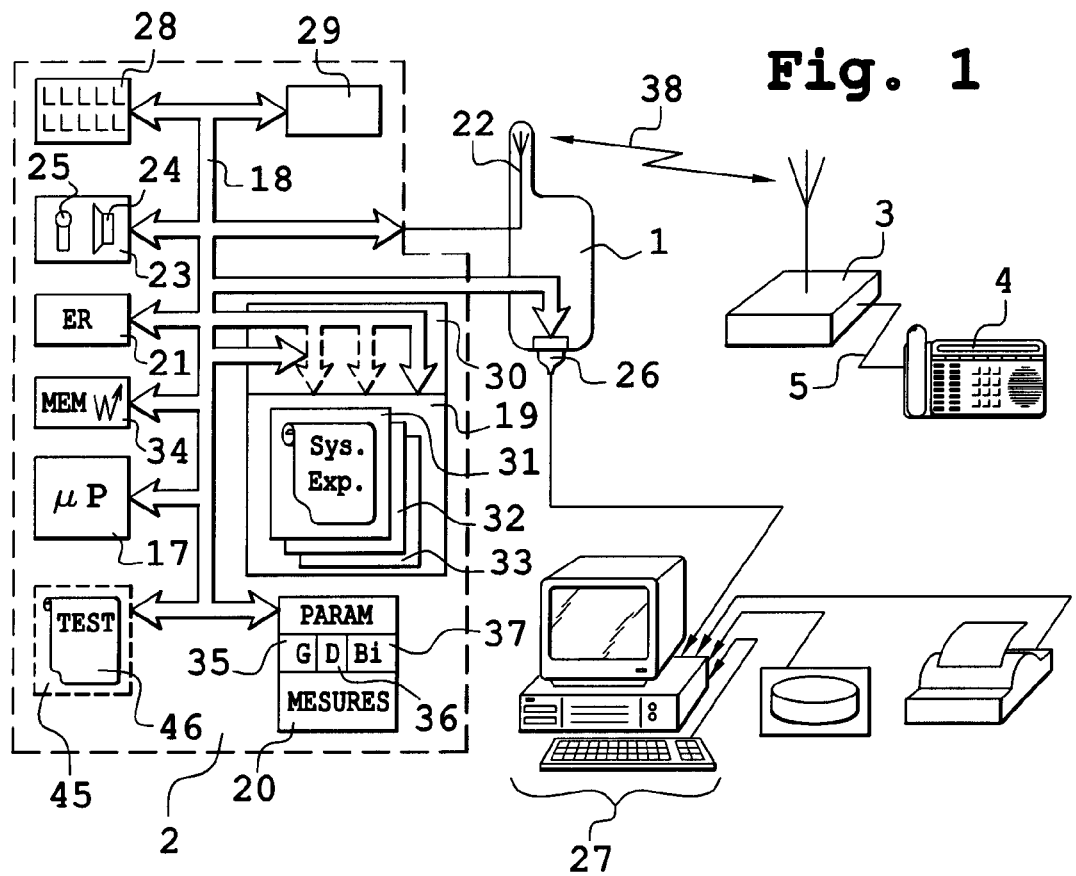
FIG. 1 is a diagrammatic view of a two-band mobile telephone that can be used according to the invention.
Figure 2A:
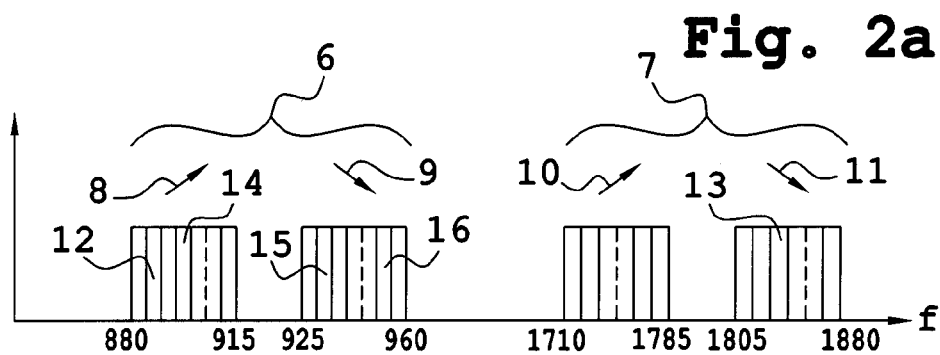
FIGS. 2a and 2b are respectively spectral and timing diagrams of the signals exchanged between the mobile telephone and a base station.

FIG. 1 shows a mobile telephone 1 comprising circuits 2 to work according to the invention in connection with a mobile telephony network. The mobile telephony network is herein diagrammatically represented by a base station 3 linked to fixed or mobile telephones 4 by a known type of infrastructure 5 that may comprise especially a switched telephone network. The mobile telephone 1, in accordance with FIG. 2a, may work in connection with the base station 3 on two bands. For example, a first band 6 is a GSM 900 MHz type band while a second band 7 is a DCS 1800 MHz type band. In a known way, each of these bands is divided into upward and downward sub-bands, respectively 8, 9, and 10, 11. In each of these bands, frequency ranges such as 12 or 13 are temporarily reserved in TDMA (Time Division Multiple Access) mode for a specific link between a mobile telephone 1 and a base station 3. These frequency ranges, in the standards indicated here above, have a width of 200 KHz and during a call each mobile telephone is led to jump from a range 12 to a range 14 according to a pseudo-random law. In reception, in the sub-band 9, the base station 3 also has to jump pseudo-randomly between the range 15 and the range 16.

The circuits 2 used for the connection of the mobile telephone 1 to the network essentially comprise a microprocessor 17 connected by means of a bus 18 with a program memory 19, a data memory 20 and transmission-reception circuits proper 21. The transmission-reception circuits 21 are capable especially of making an antenna 22 broadcast or receive the signals in the frequency ranges 12 to 16 referred to. The mobile telephone 1 comprises, also connected to the bus 18, speech peripherals 23 herein provided symbolically with a loudspeaker 24 and a microphone 25 and a connection peripheral 26 used to connect the mobile telephone to a portable microcomputer 27. The mobile telephone 1 finally comprises a keyboard 28 and a screen 29, both connected to the bus 18, enabling a user to use this mobile telephone.

According to a major characteristic of the invention, the telephone 1 comprises a forcing circuit 30 for forcing a mode of operation during connection. This forcing circuit 30 herein takes for example the form of a circuit for the selection of an operating system among three operating systems 31, 32, 33 stored in the memory 19. Depending on the selection state of the circuit 30, when the mobile telephone is put into service or at least when the connection is set up, one of these operating systems is loaded into a working memory 34 with which the microprocessor 17 works.

The depiction shown here above with three operating systems is a generic depiction. In practice, only one operating system can be used but, in this case, different parameters stored in the data memory 20 may be tapped to parametrize a single operating system contained in the memory 19. These parameters which are respectively stored in the zones 35 to 37 of the memory 20 are herein represented schematically by G corresponding to an operation according to the GSM 900 MHz standard, D corresponding to an operation according to the DCS 1800 MHz standard and Bi corresponding to an operation in two-band mode. Hereinafter we shall see how the operation dictated by the operating system thus parametrized has effects in a call 38 between the base station 3 and the mobile telephone 1.

The working of the method of the invention is as follows. Initially, the mobile telephone 1 is put into service, for example by the connection of the circuits 2 to a battery (not shown). Depending on its operating system and/or a pre-programmed state of the circuit 30, the mobile telephone runs through steps of its implementation. This step of putting into service comprises two types of operation. A first type of operation is proper to the mobile telephone and shall herein be called starting (or powering on) for putting into service and stopping (or powering off) in the contrary case. The step of putting into service also comprises another operation which is a connection to the network or, on the contrary, a disconnection of the mobile telephone from the base station 3.

During a first instance of putting into service, with the keys of the touchpad 28 or possibly with the microcomputer 27, a parametrizing operation G, D, or Bi of the mobile telephone is chosen. Then, another step of putting into service is prompted. If need be, this new putting into service comprises a stopping and restarting of the mobile telephone itself. In practice, if will be seen that it is enough to simply disconnect and change parameters of the operation for connecting the telephone 1 to the base station 3.

When this is done, at the time of reconnection to the network, the parameters induce an operation specific to each of its modes, single-band 900 MHz, single-band 1800 MHz, or two-band. Indeed, the setting up of the communication 38 begins normally, as laid down by standards, by a starting protocol. In the course of this starting protocol, the mobile telephone informs the base station of its existence in the network. For this purpose, it informs the base station especially of its class, essentially the type of mode described here above in which it is supposed to operate. Furthermore, the mobile telephone 1 informs the base station 3 of its ability to make transmission with high or lower power. Indeed, the GSM standard lays down that the maximum power of transmission by a mobile telephone is 1 watt, whereas in the DCS standard it is 2 watts. However, the transmission power may be higher if the mobile telephone is a car telephone. It is precisely this type of information that the mobile telephone I sends the base station 3. At the end of this starting recognition protocol, the base station adapts its operation to the mode indicated to it by the mobile telephone in the preliminary declaration.

Since the base station has adapted its operation, it may be considered that, with the circuit 30, it has been possible to enforce a special mode of operation during connection, among the three possible modes. The circuits of the mobile telephone 1 therefore, for this purpose, essentially comprise declaration circuits to transmit parameters corresponding to a mode. In the invention, the particular feature of these declaration circuits is located in the fact that the declared parameters are themselves programmable, taken at 35 the zones 35 to 37 of the memory 20 as a function of the state of the circuit 30. On a complementary basis of course, the operating system is adapted to the mode that the mobile telephone has declared to the base station.

Figure 2B:
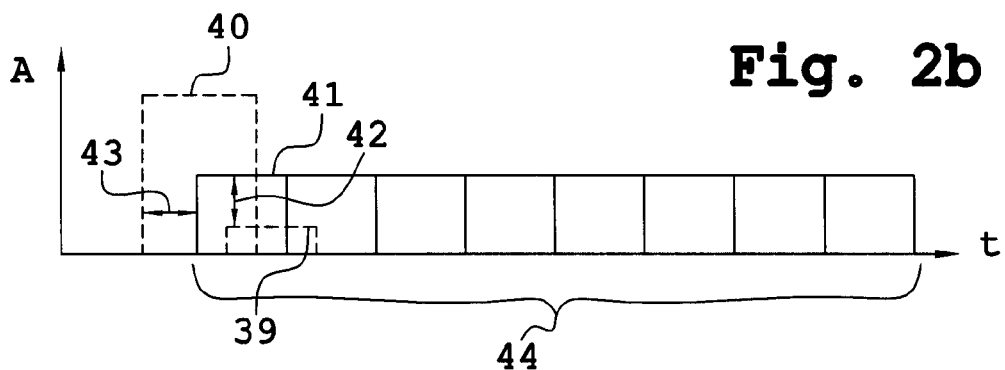

FIG. 2b is a timing diagram, in a TDMA type use, that shows the form of the amplitude of the signal coming from the mobile telephone 1 as received by the base station 3. Depending on the distance between the mobile telephone 1 and the base station 3, which may be greater or smaller than an average distance, the signal received by this base station will be a signal 39 that is weaker than a signal 41 corresponding to a mean distance and delayed with respect to this signal 41 or respectively stronger than this signal 41 and ahead of it. Thus, the base station 3 will force the mobile telephone to work in a certain way. In particular, it will impose on it a level of transmission power 42 and a time lead 43 of transmission with respect to a synchronization in the case of an average transmission. Furthermore, the base station communicates frame numbers 44 (TSn°) to the mobile telephone 1.

It is thus possible for a mobile telephone 1 to inform a base station of a particular mode of operation by the parametrizing of its declaration.

In the invention, in a test use, this particular feature of the mobile telephone is used to test all the possibilities of the network. For this purpose, the mobile telephone 1 furthermore has a memory 45 to store a test program 46. However, this test program 46 could be incorporated into the operating system of the memory 19 if the mobile telephone 1 were designed only to carry out the tests or be contained in the microcomputer 27. To carry out these three tests, the microcomputer 27 will, according to the invention, bring about a step of putting into service, the changing of the parameters, the disconnection, the reconnection of the telephone of the network and the measurement, according to the steps of the program 46, of the different characteristics of the network and then the reiteration of these operations for the two (or more) other modes.

Each of these three tests is of a known type, and the sequence of their measurements in the program 46 does not have any particular features with regard to the invention. To successfully carry out the sequence of these three tests after putting the unit out of service (with disconnection but without stopping the mobile telephone 1), a clock for the sequencing of the telephone 1 governed by the program 46 may prompt the changing of the parameters and the restarting of operations. Thus, the working of the network is successively tested according to a first band, a second band and the two-band mode.

In practice, the test program itself could be affected by the choice of the required parametrization and therefore the mode of connection of the telephone 1 with the base station 3. For example, in two-band mode, a base station 3 sends the mobile telephones SI2TER or SI5TER type signals. These signals are useful for two-band mobile telephones respectively when they are on standby and when they are communicating. In the invention, the test program 46, when used to test a mode using one band or another band (but not in the two-band mode), will ignore the signals SI2TER and SI5TER. And indeed, the base station 3 sends such signals to other two-band mobile telephones that are communicating in the vicinity.

Furthermore, in a one-band mode, only the band 6 or only the band 7 must be measured. The measurement essentially consists, for each frequency range 12 to 16, in looking for the transmission characteristics. In a single-band operation, the width of each of the bands 6 and 7 is smaller than the width of the sum of these bands 6 and 7. Consequently, the duration of measurement of the phenomena produced in these bands will be shorter. Similarly, the synchronizations corresponding to FIG. 2b may be different from one mode to another. The program 46 is adapted accordingly.

Furthermore, the declaration circuits, designed to send the contents of the parameter zones 35 or 36 or 37 to the base station 3 at the same time as the operating system and possibly the test program 46 are changed, will dispatch signals known as CLASS MARK 2 or CLASS MARK 3 type signals which respectively represent the type of mobile telephone 1 (GSM, DCS or two-band), and the power class of the mobile (its aptitude to send signals of greater power or lesser power). In particular, if the mobile telephone is located in a car, the transmission power may be greater than the standard referred to here above.

Similarly, as the case may be, in two-band mode the mobile telephone will send a piece of information, in its declaration, known as an EARLY CLASS MARK CHANGE information comprising additional information on the mobile telephone, especially on its operating priorities. Ultimately, nothing in the working of the mobile telephone is fundamentally changed beyond the declaration made to the network, the adaptations of operating systems or the adaptations of test programs. In single-band mode, for testing or for use, the mobile telephone, which is a two-band telephone, merely exploits the signals sent by the base station pertaining only to single-band telephones. In this mode, the mobile telephone 1 uses the program 46 to ascertain that the working of the base station 3 is consistent. It ascertains for example that the base station 3 has not assigned it a change of band (which it should not be able to perform since it has declared itself to be single-band station). Other known verifications of consistency of this type are undertaken by the programs 46.

What is claimed is:

1. A method for the putting into service of a multiband mobile telephone with a mobile telephony network, comprising, the mobile telephone is put into service for a first time, while the mobile telephone is in service during this first putting into service, the working of the mobile telephone is parameterized with second parameters, the mobile telephone is put out of service, then the mobile telephone is put into service a second time with the second parameters, after the second putting into service, the transmission characteristics of the network are picked up with the mobile telephone by a launched automatic test program, at the end of the launched automatic test program, an automatic changing of the working parameters of the mobile telephone into third parameters is performed, followed by a putting out of service, during a putting out of service, a sequencing clock is kept in operation, and a third putting into service is prompted with this clock.

2. A method according to claim 1, wherein the first putting into service comprises a starting of the mobile telephone followed by a connecting of the mobile telephone with the mobile telephony network, after the first putting into service, the transmission characteristics of the network are picked up with the mobile telephone by a launched automatic test program.

3. A method according to claim 1, wherein the third putting into service comprises a starting of the mobile telephone followed by a connecting of the mobile telephone with the mobile telephony network, after the third putting into service, the transmission characteristics of the network are picked up with the mobile telephone by a launched automatic test program.

4. A method according to claim 1, wherein the putting out of service of the mobile telephone comprises a disconnection of the mobile telephone from the mobile telephony network without any stopping of the mobile telephone.

5. A method according to claim 1, wherein the second putting into service comprises a declaration, to the network, of the second parameters.

* * * * *